United States Patent
Park

(10) Patent No.: US 7,813,731 B2
(45) Date of Patent: Oct. 12, 2010

(54) APPARATUS AND METHOD FOR CONTROLLING PACKET SERVICE IN MOBILE COMMUNICATION TERMINAL

(75) Inventor: Hyung-Kwan Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 822 days.

(21) Appl. No.: 11/700,554

(22) Filed: Jan. 31, 2007

(65) Prior Publication Data

US 2007/0197240 A1    Aug. 23, 2007

(30) Foreign Application Priority Data

Feb. 1, 2006   (KR) ................. 10-2006-0009574

(51) Int. Cl.
*H04W 4/00*   (2009.01)
(52) U.S. Cl. ................. 455/435.1; 455/435.2; 455/436; 455/464; 455/432.1
(58) Field of Classification Search .............. 455/435.1, 455/435.2, 436, 464, 432.1
See application file for complete search history.

(56) References Cited

U.S. PATENT DOCUMENTS

| 6,111,867 | A | 8/2000 | Mann et al. |
| 6,546,251 | B1 * | 4/2003 | Dalsgaard et al. ........... 455/437 |
| 6,600,917 | B1 * | 7/2003 | Maupin ................... 455/414.1 |
| 2004/0264368 | A1 * | 12/2004 | Heiskari et al. ............. 370/229 |
| 2005/0169289 | A1 * | 8/2005 | Sebire et al. ................ 370/412 |
| 2005/0272422 | A1 * | 12/2005 | Asadi ...................... 455/432.2 |
| 2008/0019304 | A1 * | 1/2008 | Buckley et al. ............. 370/328 |

FOREIGN PATENT DOCUMENTS

| EP | 1 553 798 | 7/2005 |
| WO | WO 98/32294 | 7/1998 |
| WO | WO 01/65864 | 9/2001 |
| WO | WO 03/092320 | 11/2003 |
| WO | WO 2004/060012 | 7/2004 |

* cited by examiner

Primary Examiner—Barry W Taylor
(74) Attorney, Agent, or Firm—The Farrell Law Firm, LLP

(57) ABSTRACT

Provided are an apparatus and method for a packet network register in a mobile communication terminal. The method includes demodulating an incoming broadcasting message; determining a packet network resource state according to specific information contained in the demodulated broadcasting message; determining whether a packet network register is required according to a predetermined attach mode; when the packet network register is required, determining whether a packet network resource is deficient according to a state value; and when the packet network resource is sufficient, performing the packet network register.

17 Claims, 4 Drawing Sheets

APPARATUS AND METHOD FOR CONTROLLING PACKET SERVICE IN MOBILE COMMUNICATION TERMINAL

PRIORITY

This application claims priority under 35 U.S.C. §119 to an application entitled "Apparatus And Method For Controlling Packet Service In Mobile Communication Terminal" filed in the Korean Intellectual Property Office on Feb. 1, 2006 and assigned Serial No. 2006-9574, the contents of which are incorporated herein by reference.

BACKGROUND OF THE INVENTION

1. Field of the Invention

The present invention relates generally to an apparatus and method for controlling a packet service in a mobile communication terminal, and in particular, to an apparatus and method for registering a packet network according to a resource status of the packet network in a mobile communication terminal.

2. Description of the Related Art

General Packet Radio Service (GPRS) was originally developed for a Global System for Mobile Communications (GSM), but was also adopted as an Interim Standard (IS)-136. GPRS is a bearer service for GSM, and it simplifies a wireless connection for a packet data network and improves its performance.

In using GPRS, a mobile terminal necessarily performs a GPRS attach procedure to register itself in a GPRS network. In the GPRS attach procedure, the mobile terminal notifies a Serving GPRS Support Node (SGSN) of a registered network position, IDentity (ID), security information, and various characteristics, which can be provided by the mobile terminal through an attach request message. Then, the SGSN accepts an attach attempt of the mobile terminal through an authentication process and makes the mobile terminal ready for the GPRS.

When the mobile terminal attempts the GPRS attach, the GPRS attach type is changed according to a network operation mode at a position where the mobile terminal is located. The GPRS attach type of the mobile terminal includes a "GPRS attach" type, a "GPRS attach while International Mobile Group Identity (IMSI) attach" type, and a "combined GPRS/IMSI attach" type.

Additionally, a GPRS attach mode regulates a time point when the mobile terminal should be attached to the GPRS network. Current network providers set up their preferable GPRS attach modes, and require the mobile terminal to perform a GPRS attach, based on the predetermined GPRS attach mode. Examples of the GPRS attach mode are an auto GPRS attach mode and a manual GPRS attach mode.

In the auto GPRS attach mode, the mobile terminal automatically performs the GPRS attach to maintain a GPRS attach state. The mobile terminal in the auto GPRS attach mode performs a GPRS attach and maintains a GPRS attach state when power is turned on or a new Public Land Mobile Network (PLMN) is selected. Unlike the auto GPRS attach mode, the mobile terminal performs a GPRS attach when a user demands the GPRS and switches to a non-GPRS attach state when the GPRS is terminated in the manual GPRS attach mode. The mobile terminal in the manual GPRS attach mode normally makes use of GSM service and performs a GPRS attach when the user demands the GPRS such as Wireless Application Protocol (WAP), Multimedia Message System (MMS), etc. When a corresponding service is terminated, the mobile terminal performs a GPRS detach.

When the mobile terminal attempts a GPRS attach, the network transmits a register reject message to the mobile terminal to restrict a GPRS network approach when the GPRS (or packet service (PS)) resource is insufficient. Upon failure of the GPRS attach, the mobile terminal periodically performs the GPRS attach until a GPRS connection is successful. In this case, signal load occurs and power consumption increases because the mobile terminal has to periodically perform the GPRS attach and a routing area update with the maximum number of times. Thereby decreasing the standby time. Moreover, in a network operation mode 1, the mobile terminal registers in terms of "combined attach" or "combined routing area update". If failed, the mobile terminal has a limited service in the GSM network. Therefore, the mobile terminal needs to register its position in an additional GSM service (or Circuit Service (CS)).

SUMMARY OF THE INVENTION

An object of the present invention is to substantially solve at least the above problems and/or disadvantages and to provide at least the advantages described below. Accordingly, an object of the present invention is to provide a method for receiving a packet network resource state in a mobile communication terminal that can access the packet network.

Another object of the present invention is to provide an apparatus and method for determining whether to register a terminal in a packet network according to a packet network resource state received from a network in a mobile communication terminal that can access a packet network.

A further object of the present invention is to provide an apparatus and method for performing a GPRS attach according to a GPRS network resource state received from a network in a mobile communication terminal that can access a GPRS network.

According to an aspect of the present invention, an apparatus for performing a packet network register in a mobile communication terminal includes a receiver for demodulating a broadcasting message received from a network; and a controller for determining a packet network resource state according to specific information contained in the modulated broadcasting message from the receiver.

According to another aspect of the present invention, a method for performing a packet network register in a mobile communication terminal includes demodulating an incoming broadcasting message; and determining a packet network resource state according to specific information contained in the demodulated broadcasting message.

According to a further aspect of the present invention, an apparatus for controlling a packet network register in a mobile communication terminal includes a base station transmitting a broadcasting message including a packet network resource information; and a terminal determining a packet network resource state according to the packet network resource information received from the base station.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

There is provided a method of receiving packet network resource information from a network in a mobile communication terminal that can access a packet network, and can also determine whether a packet network is registered according the received packet network resource information. Hereinafter, European terminals of an asynchronous system, which can access a General Packet Radio Service (GPRS) network, will be described as an example.

Moreover, the term "register" includes packet network connections such as a packet network attach and a routing area update.

Figure 1:
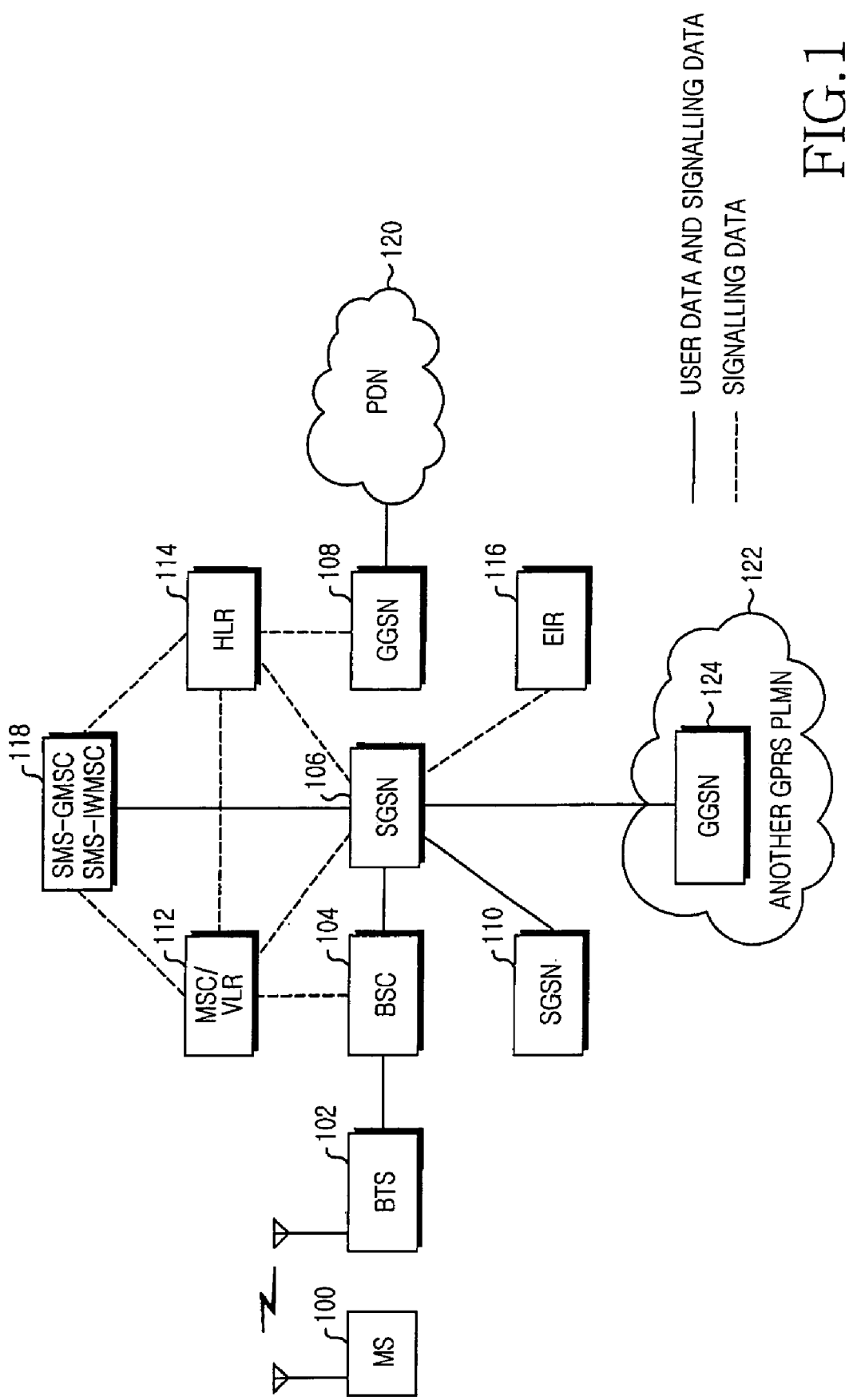
FIG. 1 is a block diagram illustrating a mobile communication system providing a circuit service and a packet service according to the present invention.

FIG. 1 is a block diagram illustrating a mobile communication system providing a circuit service and a packet service according to the present invention.

Referring to FIG. 1, a Mobile Station (MS) 100 is connected to a Base Transceiver Station (BTS) 102 through a wireless link, and also connected to a Serving GPRS Support Node (SGSN) 106 through the BTS 102 and a Base Station Controller (BSC) 104. The SGSN 106 manages one service area, and the one service area includes Location Areas (LAs). Each of the LAs is divided into a plurality of Routing Areas (RAs). A RA includes a plurality of cells. A cell represents a wireless area that a BTS 102 can manage. The BSC 104 removes a plurality of BTSs 102. The BTS 102 and the BSC 104 construct a Base Station Subsystem (BSS). MS is a mobile communication terminal.

The SGSN 106 routes and transfers packets transmitted by the MS 100 located within the management area, or packets moving toward the MS 100. in addition, the SGSN 106 performs mobility management, logical link management, authentication, and charging. The mobility management includes attach, detach, and location management. The SGSN 106 is connected to an external Packet Data Network (PDN) 120 through a Gateway GPRS Support Node (GGSN) 108, and can be connected to another SGSN 110 and a GGSN 124 of another GPRS Public Land Mobile Network (PLMN) 122.

The GGSN 108 is located between a GPRS backbone network and the PDN 120. The packet from the SGSN 106 is processed in an appropriate packet data protocol through the GGSN 108 to transmit the result to the other side through the PDN 120. A main process of the GGSN 108 is a conversion process between an effective PDP address in the PDN 120 and an effective MS address in the GSM network. The GGSN 108 needs to recognize the SGSN 106 that manages the MS 100 so as to transmit packets received from the PDN 120 to MS 100. Accordingly, a database of the GGSN 108 stores user profiles and user's current SGSN information. Like the SGSN 106, the GGSN 108 performs authentication and charging.

A many-to-many relationship exists between the SGSN and the GGSN. One GGSN is used as an interface point between a plurality of SGSN and one PDN. On the contrary, one SGSN utilizes a plurality of GGSN to transmit packets to respectively different PDN.

Alternatively, in Mobile Switching Center (MSC)/Visitor Location Register (VLR) 112, the MSC is responsible for mobility management and voice call processing of circuit service subscribers, and the VLR is a database that temporarily stores all information for terminals in a managing area of the VLR. The MSC/VLR 112 can extend its functions for an effective cooperation between a GSM circuit exchange service and a packet exchange service using GPRS. For example, position information update processes can be integrated into a single process, and attach processes can also be integrated and operated using the same method. Moreover, paging of the GSM circuit exchange service can be processed using the SGSN 106. A Gs interface is defined as a interface to connect the SGSN 106 with the database between the MSC/VLR 112 for this integration process.

A Gd interface is defined to exchange a Short Message Service (SMS) message through the GPRS. The Gd interface connects the SGSN 106 to an SMS-GMSC of a Short Message Service-Gateway Mobile Switching Center (SMS-GMSC)/a Short Message Service-Interworking Mobile Switching Center (SMS-IWMSC) 118.

A Home Location Register (HLR) 114 stores a user profile, a current SGSN address, and a PDP address for each GPRS user in the PLMN. A Gr interface between the SGSN 106 and the HLR 114 is used to exchange information between the SGSN 106 and the HLR 114. A Gc interface is a signaling path between the GGSN 108 and the HLR 114. The GGSN 108 acquires current position and profile information of a user using the Gc interface. Equipment Identity Register (EIR) 116 is a database responsible for managing IDentity (ID) of the MS 100.

In a mobile communication system providing the circuit service and the packet service, the BTS 102 broadcasts a GPRS network resource information received from the SGSN 106 over terminals in the cell using a broadcasting message. At this point, a broadcasting control channel can be used as a downlink channel broadcasting the GPRS resource information. The MS 100 interprets a broadcasting message transmitted from the BTS 102, and then continuously monitors a current packet network resource state. When a packet network resource is insufficient, the MS 100 does not perform a GPRS network register (e.g., attach, routing region update) when a GPRS network register is necessary according to a predetermined attach mode (e.g., an automatic GPRS attach mode, a manual GPRS attach mode, etc.).

Figure 2:
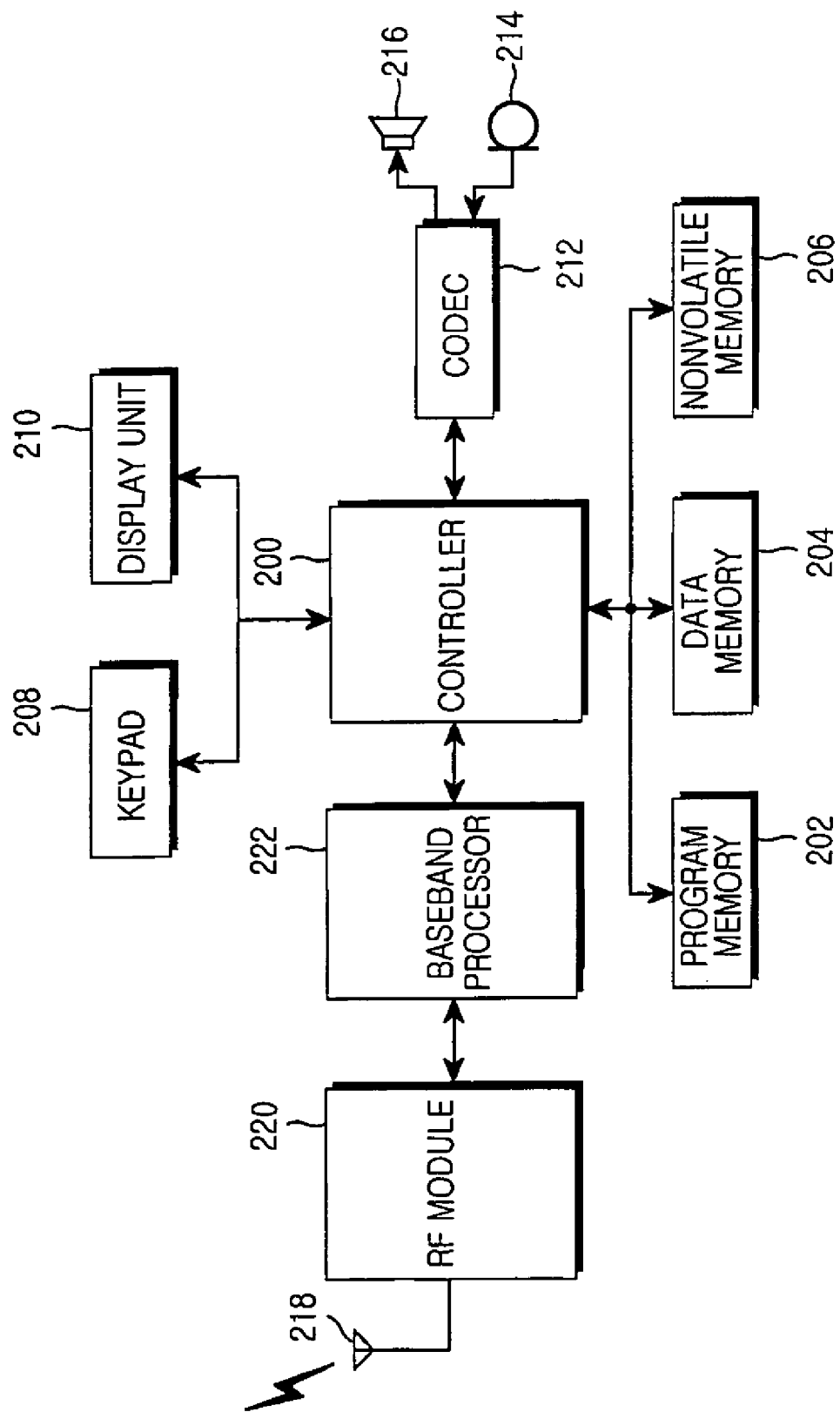
FIG. 2 is a block diagram illustrating a mobile communication terminal according to the present invention.

FIG. 2 is a block diagram illustrating a mobile communication terminal 100 according to the present invention.

Referring to FIG. 2, a controller 200 controls an overall operation of the MS 100. For example, the controller 200 performs processes and controls for circuit communication and packet communication, and parses a broadcasting message transmitted from the BTS 102 to continuously manage a current packet network resource state. Moreover, the controller 200 performs a packet network register process according to the packet network resource state. A detailed description about the typical process and control of the controller 200 will be omitted for conciseness.

A memory unit includes a program memory 202, a data memory 204, and a non-volatile memory 206. The program memory 202 stores a program for controlling an overall operation of the terminal. The program memory 202 can be implemented with a flash memory (not shown). The data memory 204 temporarily stores data generated during operations. The data memory can be implemented with a Random Access Memory (RAM). The non-volatile memory 206 stores system parameters and other data for storage (e.g., telephone, SMS message, image data, etc.). The non-volatile memory 206 can be implemented with Erasable Programmable Read Only Memory (EEPROM).

A keypad 208 includes number keys of numbers 0-9, a Menu key, a Cancel (Erase) key, a Confirmation key, a Talk key, an End key, an Internet Connection key, and Navigation keys (or direction keys). The keypad 208 transmits key input data that corresponds to a key pressed by a user to the controller 200. Display unit 210 displays status information generated during operations, various moving images and still images. A color Liquid Crystal Display (LCD) can be used for the display unit 210.

A Coder/Decoder (CODEC) 212 is connected to the controller 200, and a microphone 214 and a speaker 216 are connected to the CODEC 212. The CODEC 212, the microphone 214, and the speaker 216 serve as a voice input/output block for a voice communication. The CODEC 212 converts Pulse Code Modulation (PCM) data provided from the controller 200 into an analog voice signal to transmit the analog voice signal through the speaker 216, and converts a voice signal received from the microphone 214 into PCM data to provide the PCM data to the controller 200.

A Radio Frequency (RF) module 220 down-converts RF signal received through an antenna 218 to provide the down-converted signal to the baseband processor 222, and up-converts a baseband signal from the baseband processor 222 to transmit the up-converted signal through the antenna 218.

The baseband processor 222 processes a baseband signal transmitted/received between the RF module 220 and the controller 200. The baseband processor 222 can be a MODEM that supports both a circuit network (e.g., GSM network) access and a packet network (e.g., GPRS network) access. The baseband processor 222 demodulates a broadcasting message received from the BTS 102 according to a predetermined scheme to provide the demodulated broadcasting message to the controller 200. The controller 200 acquires a packet network resource state by parsing information of the demodulated broadcasting message and determines whether to register a packet network according to the packet network resource state. This process will be described in detail herein with reference to FIGS. 3 and 4.

Figure 3:
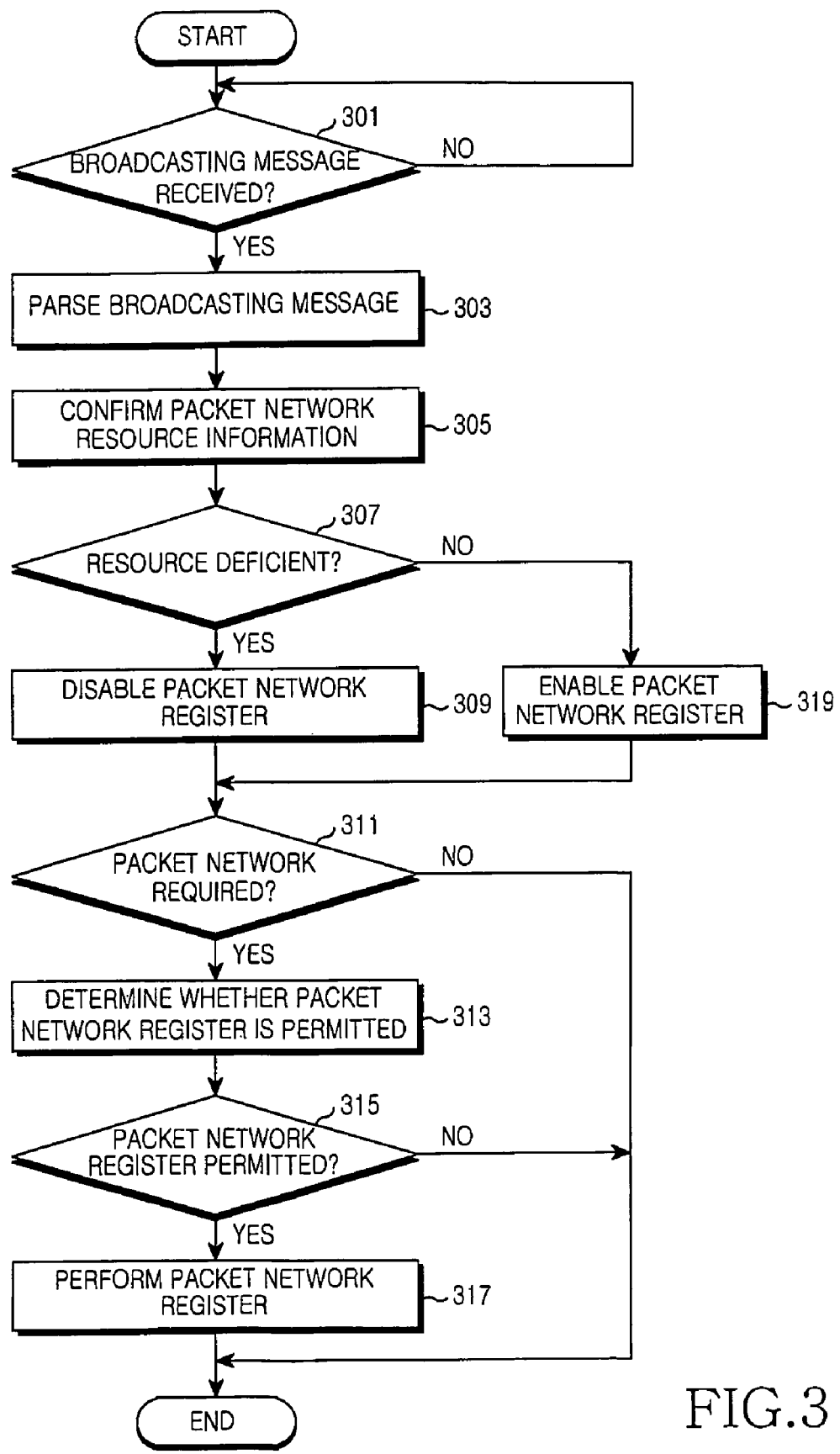
FIG. 3 is a flowchart illustrating a packet network register in a mobile communication terminal according to the present invention.

FIG. 3 is a flowchart illustrating a packet network register process in a mobile communication terminal according to the present invention. Specifically, FIG. 3 illustrates a process of determining whether to register a packet network when power is on or the terminal is moved to another area.

Referring to FIG. 3, the controller 200 determines whether a broadcasting message is received within a cell in step 301. The broadcasting message can be an existing Broadcasting Control Channel (BCCH) message or a newly defined message. In the former case, packet network (e.g., GPRS network) resource information can be recorded in a reserved field of the BCCH message.

When the broadcasting message is received, the controller 200 parses the received broadcasting message in step 303, and confirms packet network resource information of the broadcasting message in step 305. The packet network resource information represents the resource state of the packet network. For example, when the packet network resource information is expressed as a bit, '0' represents that the resource is deficient and '1' represents that the resource is sufficient.

In step 307, the controller 200 determines whether the identified packet network resource information represents the "resource deficiency" in step 307. When the identified packet network resource information represents the resource deficiency, the controller 200 disables a packet network register in step 309, and the process proceeds to step 311. Alternatively, when the identified packet network resource information represents the resource sufficiency, the controller 200 enables a packet network register in step 319, and the process proceeds to step 311.

In step 311, the controller 200 determines whether a packet network register is required according to a preset packet network attach mode. The packet network attach mode includes an automatic packet network attach mode and a manual packet network attach mode and can also include another attach mode provided by a network provider. Moreover, the packet network register process includes a packet network attach process and a routing area update process.

When the packet network register is not required, the controller 200 terminates the algorithm. When the packet network register is required, the controller 200 accesses a predetermined memory area (register or flag) having permission information of the packet network register in step 313, and determines whether the packet network register is permitted in step 315.

In step 317, the controller 200 registers the packet network when the packet network is permitted. However, the controller 200 terminates the process when the packet network is not permitted.

As an example, when power of the terminal is turned on and information indicating that the packet network resource is deficient is received from the network, the terminal performs the register process in the circuit network (e.g., GSM network), but not in the packet network (e.g., GPRS network). As another example, when the terminal is moved to another area and information indicating that the packet network resource is deficient is received from the network, the terminal does not perform the register process (the routing area update process) in the packet network according to a terminal mobility.

Figure 4:
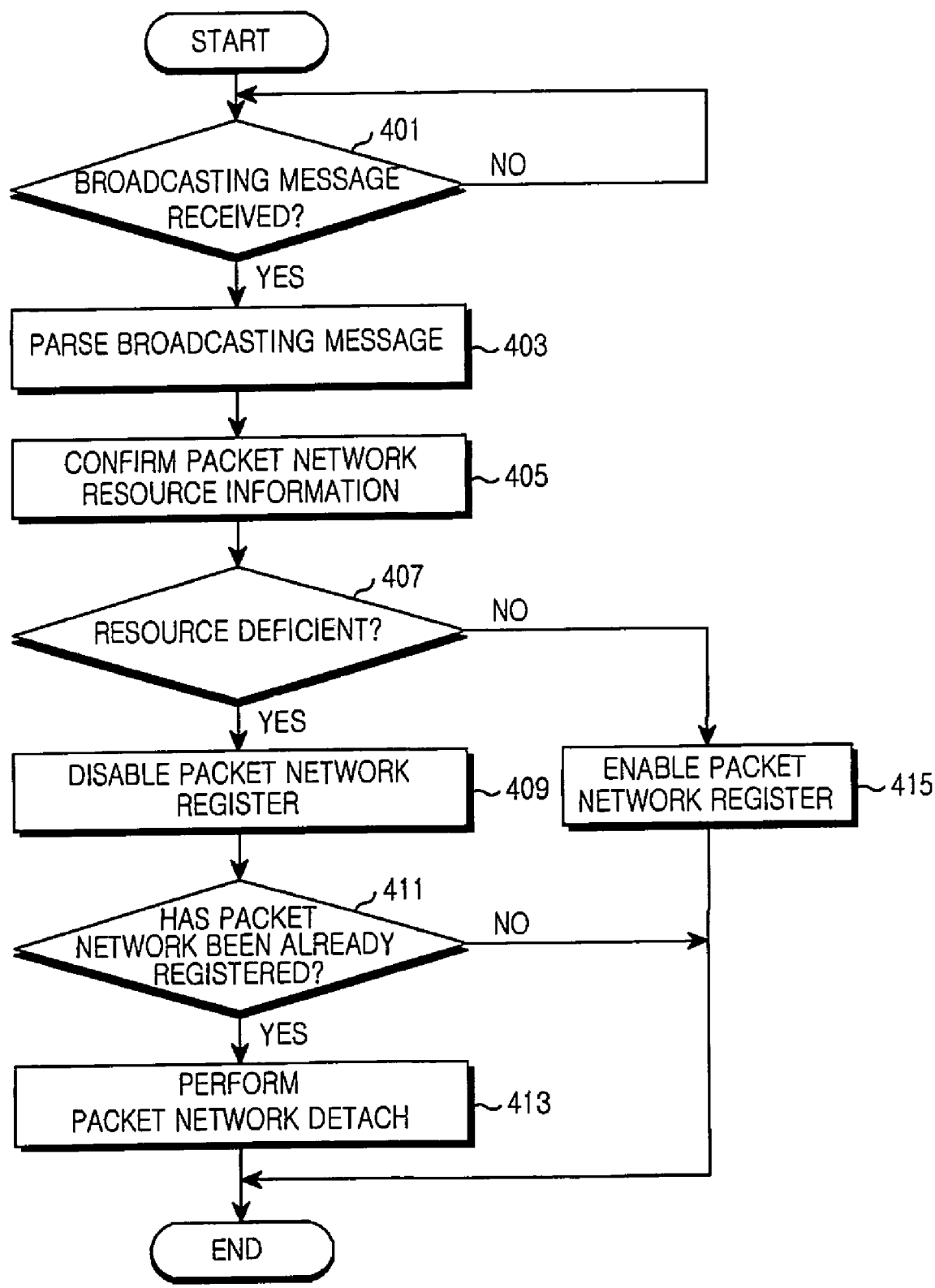
FIG. 4 is a flowchart illustrating a packet network register in a mobile communication terminal according to the present invention.

FIG. 4 is a flowchart illustrating a packet network register process in a mobile communication terminal according to another embodiment of the present invention. Specifically, FIG. 5 illustrates a process of determining whether to register a packet network using a periodically or continuously received broadcasting message in an identical area (or cell).

Referring to FIG. 4, in step 401 the controller 200 determines whether a broadcasting message is received in a cell. The broadcasting message can be an existing Broadcast Control CHannel (BCCH) message or a newly defined message. In the former case, the packet network (e.g., GPRS network) resource information may be recorded in a reserved field of the BCCH message.

In step 403, when the broadcasting message is received, the controller 200 parses the received broadcasting message, and in step 405 confirms packet network resource information of the broadcasting message. The packet network resource information represents the resource state of the packet network. For example, when the packet network resource information is expressed as a bit, '0' represents that the resource is deficient and '1' represents that the resource is sufficient.

In step 407, the controller 200 determines whether the identified packet network resource information is the resource deficiency. In step 409, when the identified packet network resource information represents the resource deficiency, the controller 200 disables a packet network register, and the process proceeds to step 411. Alternatively, in step 415 when the identified packet network resource information represents the resource sufficiency, the controller 200 enables a packet network register and terminates the algorithm.

In step 411, the controller 200 determines whether the terminal has been already registered in the packet network in step 411. When the terminal has not been registered, the controller 200 terminates the algorithm. In step 413, when the terminal has been registered in the packet network, the controller 200 performs a packet network detach and terminates the algorithm. The packet network detach is optional. As an example, the packet network detach can be performed with respect to a packet service inside the terminal. As another example, the packet network detach can be for transferring a signal to detach to the packet network.

When the packet network register is required according to the preset attach mode, the terminal access a predetermined memory area (register or flag) having permission information of the packet network register and performs a packet network register only when the packet network register is permitted.

Although not described in the herein above, the packet network resource information can be further sub-divided to define a state representing that a packet network resource is deficient but a service is possible in a previously registered terminal. For example, by allocating two bits to the packet network resource information, '00' represents the resource deficiency, '01' represents the resource sufficiency, and '10' represents that a service is possible for the previously registered terminal even though a resource is deficient. When the packet network resource information indicating that the packet network resource is deficient, but the service is possible in the previously registered terminal is received from the network, the terminal does not need to perform the packet network detach in step 413 as explained in FIG. 4.

As described above, because the present invention notifies the terminal of the packet network resource deficiency that can occur during a specific time or a specific situation, it is possible to prevent the terminal from being unnecessarily registered in the packet network (e.g., GPRS network). That is, because the re-attempt of the terminal according to no response of a network or rejection can be removed, the network load and power consumption can be reduced. Moreover, because unnecessary circuit network (e.g., GSM network) load is reduced, a temporary communication failure can be removed.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile communication terminal for performing a packet network register, comprising:
    a receiver for demodulating a broadcasting message received from a network; and
    a controller for determining a packet network resource state according to specific information contained in the demodulated broadcasting message from the receiver;
    wherein the packet network resource state indicates whether a packet network resource is deficient for providing a service for the mobile communication terminal or sufficient for providing the service for the mobile communication terminal; and
    wherein, when the packet network register is required and the mobile communication terminal has already been registered in a packet network, the controller determines whether the packet network resource is deficient according to a state value, and the controller performs a detach process on the packet network when the packet network resource is deficient.

2. The terminal of claim 1, wherein the packet network is a General Packet Radio Service (GPRS) network.

3. The terminal of claim 1, wherein the broadcasting message is a Broadcasting Control CHannel (BCCH) message.

4. The terminal of claim 1, wherein when the packet network register is required and the mobile communication terminal has not already been registered in the packet network, the controller determines whether the packet network resource is deficient according to the state value and the controller does not perform the packet network register when the packet network resource is deficient.

5. A method for performing a packet network register in a mobile communication terminal, comprising the steps of:
    demodulating an incoming broadcasting message;
    determining a packet network resource state according to specific information contained in a demodulated broadcasting message, wherein the packet network resource state indicates whether a packet network resource is deficient for providing a service for the mobile communication terminal or sufficient for providing the service for the mobile communication terminal;
    determining whether the packet network register is required according to a predetermined attach mode;
    when the packet network register is required, determining whether the mobile communication terminal has been already registered in a packet network and whether the packet network resource is deficient according to a state value; and
    when the mobile communication terminal has already been registered and the packet network resource is deficient, performing a detach process on the packet network.

6. The method of claim 5, further comprising:
    when the mobile communication terminal has not already been registered and the packet network resource is not deficient, performing the packet network register.

7. The method of claim 6, wherein the predetermined attach mode is an auto packet network attach mode or a manual packet network attach mode.

8. The method of claim 5, wherein the packet network is a General Packet Radio Service (GPRS) network.

9. The method of claim 5, wherein the broadcasting message is a Broadcasting Control Channel (BCCH) message.

10. A wireless communication system for controlling a packet network register, comprising:
    a base station transmitting a broadcasting message including a packet network resource information; and
    a mobile communication terminal determining a packet network resource state according to the packet network resource information received from the base station;
    wherein the packet network resource state indicates whether a packet network resource is deficient for providing a service for the mobile communication terminal or sufficient for providing the service for the mobile communication terminal; and
    wherein, when the packet network register is required and the mobile communication terminal has already been registered in a packet network, the mobile communication terminal determines whether the packet network resource is deficient according to a state value, and the mobile communication terminal performs a detach process on the packet network when the packet network resource is deficient.

11. The system of claim 10, wherein the packet network is a General Packet Radio Service (GPRS) network.

12. The system of claim 11, wherein the broadcasting message is Broadcasting Control CHannel (BCCH) message.

13. The system of claim 11, wherein when the packet network register is required and the mobile communication terminal has not already been registered in the packet network, the mobile communication terminal determines whether the packet network resource is deficient according to the state value, and the mobile communication terminal does not perform the packet network register when the packet network resource is deficient.

14. A method for controlling a packet network register in a wireless communication system, comprising the steps of:

transmitting a broadcasting message including a packet network resource information at a base station; and determining a packet network resource state according to the packet network resource information received from the base station at a mobile communication terminal;

wherein the packet network resource state indicates whether a packet network resource is deficient for providing a service for the mobile communication terminal or sufficient for providing the service for the mobile communication terminal; and wherein, when the packet network register is required and the mobile communication terminal has already been registered in a packet network, the mobile communication terminal determines whether the packet network resource is deficient according to a state value, and the mobile communication terminal performs a detach process on the packet network when the packet network resource is deficient.

15. The method of claim 14, wherein the packet network is a General Packet Radio Service (GPRS) network.

16. The method of claim 14, wherein the broadcasting message is Broadcasting Control CHannel (BCCH) message.

17. The method of claim 14, wherein when the packet network register is required and mobile communication terminal has not already been registered in the packet network, the mobile communication terminal determines whether the packet network resource is deficient according to the state value, and the mobile communication terminal does not perform the packet network register when the packet network resource is deficient.

* * * * *